United States Patent
Kazakov et al.

(10) Patent No.: US 11,093,580 B2
(45) Date of Patent: Aug. 17, 2021

(54) MATRIX MULTIPLIER WITH SUBMATRIX SEQUENCING

(71) Applicant: ADVANCED MICRO DEVICES, INC., Santa Clara, CA (US)

(72) Inventors: Maxim V. Kazakov, San Diego, CA (US); Jian Mao, San Diego, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/176,449

(22) Filed: Oct. 31, 2018

(65) Prior Publication Data

US 2020/0133991 A1    Apr. 30, 2020

(51) Int. Cl.
*G06F 17/16*    (2006.01)

(52) U.S. Cl.
CPC ..................... *G06F 17/16* (2013.01)

(58) Field of Classification Search
CPC .......................................................... G06F 17/16
See application file for complete search history.

(56) References Cited

U.S. PATENT DOCUMENTS

| | | | |
|---|---|---|---|
| 8,577,951 B1 * | 11/2013 | Langhammer | G06F 17/16 708/607 |
| 10,032,247 B2 | 7/2018 | Zhou | |
| 10,067,910 B2 | 9/2018 | Zhou | |
| 2005/0240646 A1 * | 10/2005 | Lin | G06F 7/607 708/607 |
| 2012/0278376 A1 * | 11/2012 | Bakos | G06F 17/16 708/607 |
| 2018/0246855 A1 | 8/2018 | Redfern et al. | |
| 2019/0004794 A1 * | 1/2019 | Raghavan | G06F 9/3012 |

FOREIGN PATENT DOCUMENTS

| | | |
|---|---|---|
| CN | 107622037 A | 1/2018 |
| CN | 108491359 A | 9/2018 |

OTHER PUBLICATIONS

International Search Report and Written Opinion dated Oct. 1, 2019 for International Application No. PCT/US2019/037656, 11 pages.

* cited by examiner

*Primary Examiner* — Michael D. Yaary

(57) ABSTRACT

A processor sequences the application of submatrices at a matrix multiplier to reduce the number of input changes at an input register of the matrix multiplier. The matrix multiplier is configured to perform a matrix multiplication for a relatively small matrix. To multiply two larger matrices the GPU decomposes the larger matrices into smaller submatrices and stores the submatrices at input registers of the matrix multiplier in a sequence, thereby calculating each column of a result matrix. The GPU sequences the storage of the submatrices at the input registers to maintain input data at one of the input registers over multiple calculation cycles of the matrix multiplier thereby reducing power consumption at the GPU.

20 Claims, 5 Drawing Sheets ns. In at least one embodiment, the GPU 100 is part of a processor that is generally configured to execute sets of instructions in order to carry out operations on behalf of an electronic device. Accordingly, in different embodiments the GPU 100 is part of an electronic device such as a desktop or laptop computer, a server, a handheld electronic device such as a smartphone or tablet, a game console, and the like. The GPU 100 is generally configured to execute graphics and vector processing operations on behalf of the processor. For example, in some embodiments, a central processing unit (CPU, not shown at FIG. 1) of the processor provides the GPU with sets of operations for execution, whereby the sets of operations are associated with graphics or vector processing.

MATRIX MULTIPLIER WITH SUBMATRIX SEQUENCING

BACKGROUND

Modern processor applications often require relatively complex manipulation of vectors, matrices, and similar structures. For example, vector and matrix manipulation is useful in graphics operations, digital signal processing applications, neural network applications, and the like. To enhance processing efficiency for these applications and operations, a processor can include a graphics processing unit (GPU). The GPU includes specialized hardware to perform parallel processing for relatively large blocks of data. Accordingly, the GPU can support graphics applications, as well as other operations that require vector and matrix manipulation. To further enhance processing efficiency, a GPU can include dedicated hardware to perform designated types of matrix operations, including matrix multiplication. However, conventional approaches to this dedicated hardware can consume a large amount of power and thereby negatively impact processor performance.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for reducing power consumption at a graphics processing unit (GPU) of a processor by sequencing the application of submatrices at a matrix multiplier to reduce the number of input changes at an input register of the matrix multiplier. The matrix multiplier is configured to perform a matrix multiplication for a relatively small matrix (e.g., a 4×4 matrix). To multiply two larger matrices (e.g., 16×16 matrices) the GPU decomposes the larger matrices into smaller submatrices and stores the submatrices at input registers of the matrix multiplier in a sequence, thereby calculating each column of a result matrix. The GPU sequences the storage of the submatrices at the input registers to maintain input data at one of the input registers over multiple calculation cycles of the matrix multiplier thereby reducing power consumption at the GPU.

Figure 1:
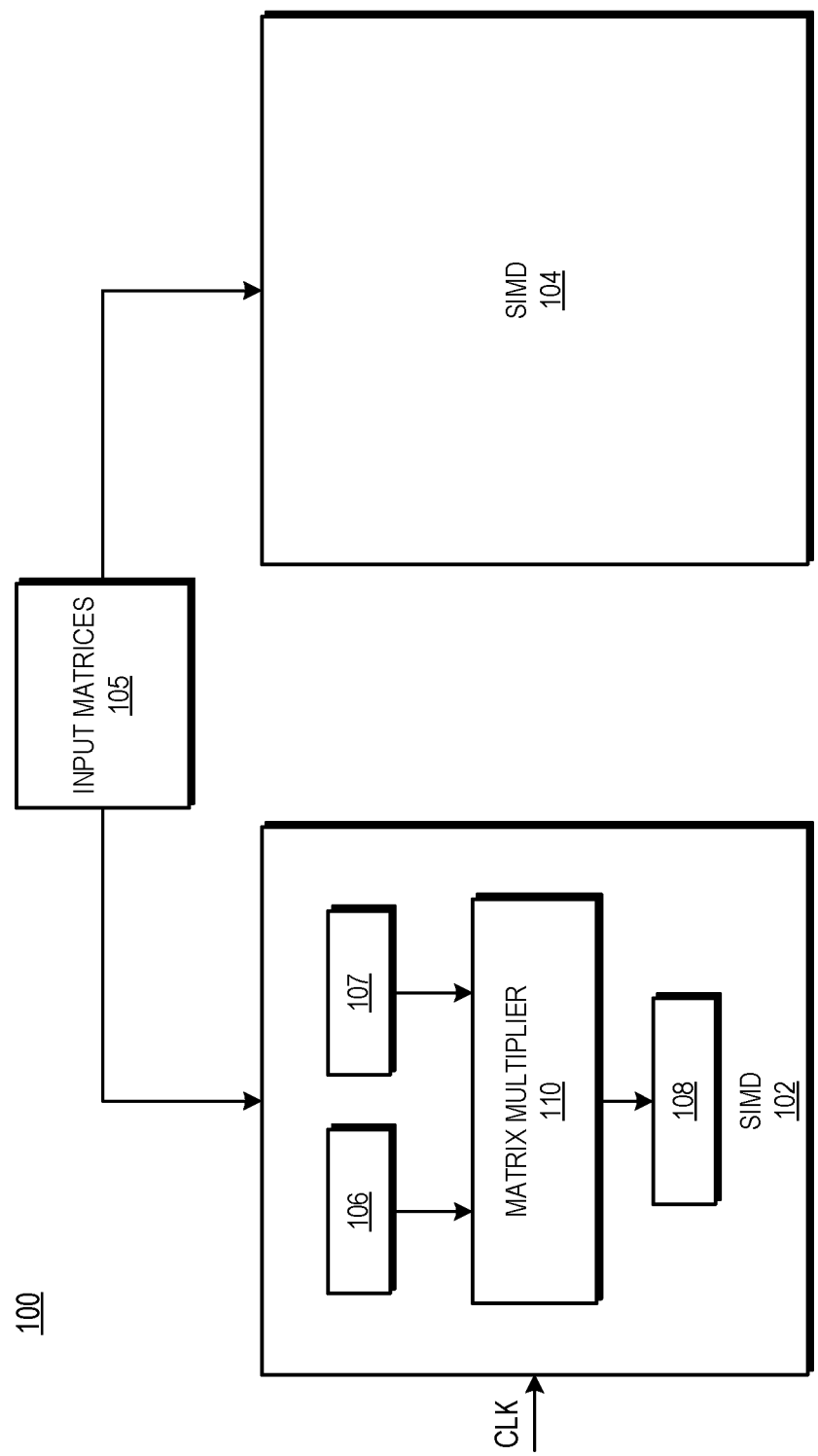
FIG. 1 is a block diagram of a GPU of a processor, the GPU configured to perform matrix multiplication by sequencing the application of submatrices to a matrix multiplier in accordance with some embodiments.

FIG. 1 illustrates a GPU 100 of a processor that configured to perform matrix multiplication by sequencing the application of submatrices in accordance with some embodi- To facilitate execution of the provided operations, the GPU 100 includes a plurality of Single-Instruction Multiple-Data (SIMD) processing units (e.g., SIMD units 102 and 104). It will be appreciated that the GPU 100 also includes additional modules to support the SIMD units, such as fetch and decode logic to fetch and decode instructions for the SIMD units, a register file to store operands for the SIMD units, and the like. To support matrix multiplication operations of a set of input matrices 105, each SIMD unit includes a matrix multiplier together with corresponding input registers and a corresponding output register. For example, the SIMD unit 102 includes a matrix multiplier 110, input registers 106 and 107, and an output register 108. It will be appreciated that the term "register" refers to any storage module that is configured to store matrices (including submatrices).

The matrix multiplier 110 is configured to multiply matrices stored at the registers 106 and 107 and store the resulting product at the register 108. The generation of a single product for matrices at the input registers 106 and 102 is referred to herein as a "multiplication cycle" for the matrix multiplier 110. In some embodiments, the SIMD unit 102 is clocked by a clock signal (designated "CLK") and a multiply cycle of the matrix multiplier 110 corresponds to a single clock cycle of the CLK clock signal. That is, for a single clock cycle of the CLK clock signal, the matrix multiplier 110 is configured to generate a product at the register 108 based on input operands stored at the input registers 106 and 107. In other embodiments, each multiply cycle of the matrix multiplier 110 requires multiple cycles of the CLK clock signal.

In some embodiments, to conserve circuit area, the matrix multiplier 110 is configured to generate a product for relatively small input matrices. For example, in some embodiments the matrix multiplier 110 is a 4×4×4 multiplier, such that the matrix multiplier 110 is configured to multiply a 4×4 matrix stored at the input register 106 with a 4×4 matrix stored at the input register 107 to generate a 4×4 product (result) matrix at the output register 108. However, in some scenarios, the CPU provides the GPU 100 with operations requiring multiplication of larger matrices, such as multiplication of 16×16 matrices. To support multiplication of larger matrices, the SIMD is configured to decompose the larger matrices into multiple smaller submatrices, multiply the sub matrices at the matrix multiplier 110 to generate a set of intermediate results, and combine the intermediate results to generate a product for the larger matrices.

To illustrate, in some embodiments, the matrix multiplier 110 multiplies input matrices, designated matrix A, an M×K matrix, and matrix B, a K×N matrix, to calculate a result matrix R (an M×N) matrix. The matrices A and B are stored at the input registers 106 and 107, respectively, and the result matrix R is stored at the output register 108. In some embodiments, the matrix multiplier 110 calculates the result matrix R by calculating the inner (dot) product of the ith row and jth column, as set forth by the following formula:

$$R_{i,j} = \text{Sum } A_{i,k} * B_{k,j}, k=0 \ldots K-1, \text{ for } i \text{ in } [0 \ldots M-1] \text{ and } j \text{ in } [0 \ldots N-1] \quad (5)$$

In other embodiments, the matrix multiplier 110 calculates the result matrix R by summing the K outer products of column k of the A matrix and row k of the B matrix, as set forth by the following formula:

$$R = \text{Sum } R^k, R^k_{i,j} = A_{i,k} * B_{k,j}$$

For larger matrices, the SIMD 102 decomposes the input matrices into smaller submatrices that are the specified input size for by the matrix multiplier 110, multiplies the submatrices at the matrix multiplier 110 to generate a set of intermediate results, and combines the intermediate results to determine the final result matrix R. Thus, for embodiments wherein the matrix multiplier calculates the inner product, the SIMD 102 decomposes the input matrices into smaller submatrices, determines the products of different sets of the submatrices based on dot products of the different sets, then calculates the outer product for the resulting dot products to determine the final result matrix.

It will be appreciated that, as described further herein, calculating the different intermediate results (the different submatrix products) requires changing the submatrices stored at the input registers 106 and 107. However, each change in data stored at an input register consumes power at the GPU 102. In addition, each change in data at the inputs of the corresponding arithmetic logic units (ALUs) or other modules of the matrix multiplier 110 consumes additional power, relative to maintaining the input data in an unchanged state. Accordingly, to conserve power, the SIMD 102 sequences the storage of submatrices at the input registers 106 and 107 such that a submatrix is maintained at one of the input registers (e.g., register 107) for a plurality of successive multiply cycles, until that submatrix is no longer needed for calculation of the result matrix R. That is, the SIMD 102 sequences application of input submatrices at the input registers 106 and 107 to reduce the amount of input switching at one of the registers and, as a result, at one of the inputs of the matrix multiplier 110, thereby conserving power.

Figure 2:
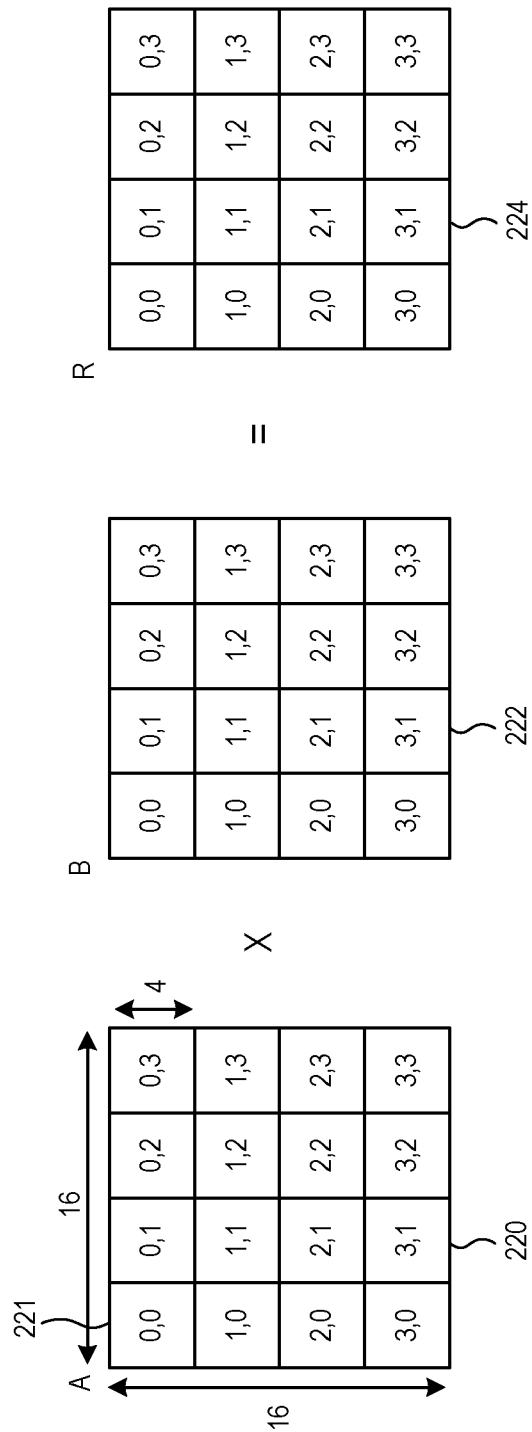
FIG. 2 is a diagram illustrating example matrices for multiplication at the GPU of FIG. 1 in accordance with some embodiments.
Figure 3:
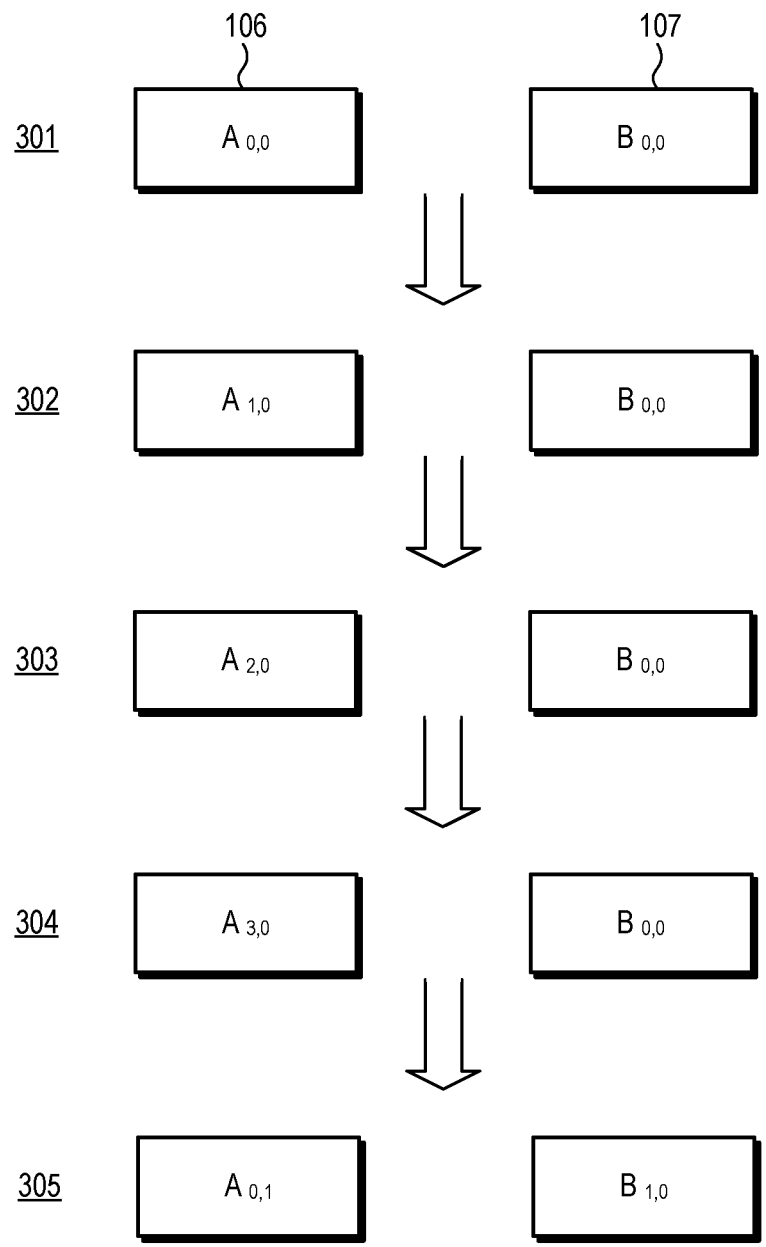
FIG. 3 is a diagram illustrating an example of sequencing the application of submatrices to the matrix multiplier of FIG. 1 in accordance with some embodiments.

An example of sequencing the input submatrices at the GPU 100 is described with respect to FIGS. 2 and 3. FIG. 2 illustrates an example of two 16×16 matrices 220 and 222, designated matrix Z and matrix B, respectively. Each of the matrices A and B include 16 4×4 submatrices (e.g., submatrix 221 of matrix A). The matrices A and B are multiplied at the GPU 102 to generate a result matrix 224, designated matrix R, which also includes a plurality of 4×4 submatrices. The matrix R can be viewed as a set of columns of submatrices. For example, the first column of R is composed of submatrices $R_{0,0}$, $R_{1,0}$, $R_{2,0}$, and $R_{3,0}$. As described further below, in some embodiments the GPU 100 calculates the matrix R by calculating each column of submatrices of R, then concatenates the different columns to form the R matrix. In some embodiments, each column of submatrices of R is calculated concurrently at a different corresponding SIMD of the GPU 100, and one of the SIMDs then concatenates the submatrix columns to form R.

To calculate a column of submatrices of R, the corresponding SIMD employs its matrix multiplier to determine a set of inner (dot) products for corresponding submatrices of the matrices A and B, then calculates outer products over the inner product results. For example, to generate the submatrix $R_{0,0}$, the SIMD 102 performs the following calculations:

$$R_{0,0} = A_{0,0} * B_{0,0}$$

$$R_{0,0} \mathrel{+}= A_{0,1} * B_{1,0}$$

$$R_{0,0} \mathrel{+}= A_{0,2} * B_{2,0}$$

$$R_{0,0} \mathrel{+}= A_{0,3} * B_{3,0}$$

where "+=" denotes adding the corresponding product to the previous value for $R_{0,0}$. Similarly, to generate the submatrix $R_{1,0}$, the SIMD 102 performs the following calculations:

$$R_{1,0} = A_{1,0} * B_{0,0}$$

$$R_{0,0} \mathrel{+}= A_{1,1} * B_{1,0}$$

$$R_{0,0} \mathrel{+}= A_{1,2} * B_{2,0}$$

$$R_{0,0} \mathrel{+}= A_{1,3} * B_{3,0}$$

The SIMD 102 performs analogous calculations to generate the submatrices $R_{2,0}$ and $R_{3,0}$.

To perform each multiplication for calculating a corresponding submatrix, the SIMD 102 loads the corresponding submatrices of matrix A and matrix B into the input registers 106 and 107, respectively, and the matrix multiplier 110 performs the multiplication, storing the result at the output register 108. However, as can be seen from the above examples, submatrices of the matrix B are reused to calculate different submatrices of the matrix R. Accordingly, the SIMD 102 is configured to sequence the multiplications, so that the submatrices of the matrix B, as stored at the input register 107, remain unchanged over a plurality of successive multiplication cycles of the matrix multiplier 110. The SIMD 102 thereby reduces the number of loads to the input register 107 and changes of the input of the matrix multiplier 110, thus reducing power consumption.

An example of a portion of the input sequencing is illustrated at FIG. 3 in accordance with some embodiments. FIG. 3 illustrates a set of successive multiplication cycles 301-305 and the corresponding contents of each of the input registers 106 and 107. Thus, in the depicted example, for the multiplication cycle 301, the SIMD 102 loads the submatrices $A_{0,0}$ and $B_{0,0}$ to the input registers 106 and 107, respectively. As described further below, the matrix multiplier 110 multiplies the submatrices to calculate an intermediate result for the first column of the result matrix R. For the next multiplication cycle 302 (the multiplication cycle that immediately follows multiplication cycle 301), the SIMD 102 loads the submatrix $A_{1,0}$ into the input register 106, but maintains the submatrix $B_{0,0}$ at the input register 107. The matrix multiplier 110 multipliers the submatrices to calculate another intermediate result for the first column of the result matrix R.

For the next multiplication cycle 303 the SIMD 102 loads the submatrix $A_{2,0}$ into the input register 106, but maintains the submatrix $B_{0,0}$ at the input register 107. The matrix multiplier 110 multipliers the submatrices to calculate still another intermediate result for the first column of the result matrix R. For the next multiplication cycle 304 the SIMD 102 loads the submatrix $A_{3,0}$ into the input register 106, but maintains the submatrix $B_{0,0}$ at the input register 107. The matrix multiplier 110 multipliers the submatrices to calculate another intermediate result for the first column of the result matrix R. For the next multiplication cycle 305, all calculations that require the submatrix $B_{0,0}$ have been completed. Accordingly, for the multiplication cycle 305, the SIMD 102 loads the submatrix $A_{0,1}$ into the input register 106 and the submatrix $B_{1,0}$ into the input register 107. Thus, in the depicted example, the SIMD 102 maintains the submatrix $B_{0,0}$ at the input register 107 for four consecutive (successive) multiplication cycles, thereby conserving the power that would otherwise be required to change the input submatrix and calculate the matrix multiplication result.

The SIMD 102 continues executing multiplication operations at the matrix multiplier 110 and combining the resulting products to calculate the first column of the result matrix R. The sequence of multiplications (including corresponding input matrices loaded and maintained at the input registers 106 and 107) is as follows:

$R_{0,0} = A_{0,0} * B_{0,0}$
$R_{1,0} = A_{1,0} * B_{0,0}$     <= B input maintained
$R_{2,0} = A_{2,0} * B_{0,0}$     <= B input maintained
$R_{3,0} = A_{3,0} * B_{0,0}$     <= B input maintained (used 4×)
$R_{0,0} += A_{0,1} * B_{1,0}$    <= B input updated
$R_{1,0} += A_{1,1} * B_{1,0}$    <= B input maintained
$R_{2,0} += A_{2,1} * B_{1,0}$    <= B input maintained
$R_{3,0} += A_{3,1} * B_{1,0}$    <= B input maintained (used 4×)
$R_{0,0} += A_{0,2} * B_{2,0}$    <= B input updated
$R_{1,0} += A_{1,2} * B_{2,0}$    <= B input maintained
$R_{2,0} += A_{2,2} * B_{2,0}$    <= B input maintained
$R_{3,0} += A_{3,2} * B_{2,0}$    <= B input maintained (used 4×)
$R_{0,0} += A_{0,3} * B_{3,0}$    <= B input updated
$R_{1,0} += A_{1,3} * B_{3,0}$    <= B input maintained
$R_{2,0} += A_{2,3} * B_{3,0}$    <= B input maintained
$R_{3,0} += A_{3,3} * B_{3,0}$    <= Calculation complete for first column of R The GPU 102 performs similar calculations to calculate the other columns of the result matrix R. In some embodiments, the GPU 102 employs a different SIMD to concurrently calculate a corresponding column of the result matrix R, and employs one of the SIMDs, or other module, to concatenate the different columns into the final result matrix R.

Figure 4:
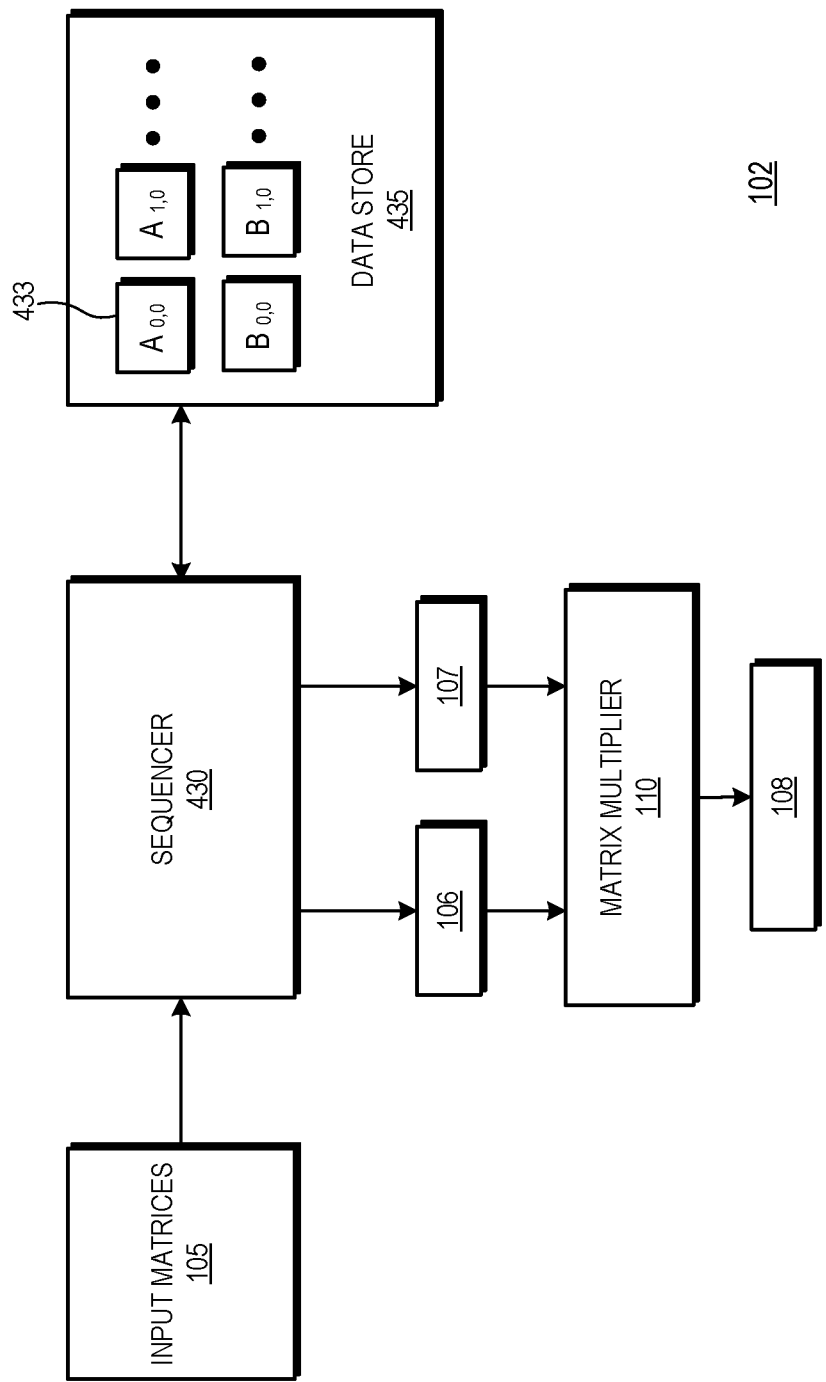
FIG. 4 is a block diagram of additional aspects of the GPU of FIG. 1 supporting submatrix sequencing in accordance with some embodiments.

FIG. 4 illustrates additional aspects of the SIMD 102 of FIG. 1 to support sequencing of input submatrices for the matrix multiplier 110 in accordance with some embodiments. In the depicted example, the SIMD 102 includes a data store 435 connected to a sequencer 430. The data store 435 is a buffer, cache, register file, or other memory structure configured to store submatrices (e.g., submatrix 433) for the matrix multiplier 110. The sequencer 430 is a hardware module configured to decompose the input matrices 105 (matrix A and matrix B) into corresponding submatrices and store the submatrices at the data store 435. The sequencer 430 is further configured to, for corresponding multiplication cycles, retrieve one or more submatrices from the data store 435 and load each retrieved submatrix to the corresponding input register 106 and 107. The sequencer 430 thus controls the sequencing of input submatrices at the matrix multiplier 110 to carry out a matrix multiplication of a relatively large matrix.

Figure 5:
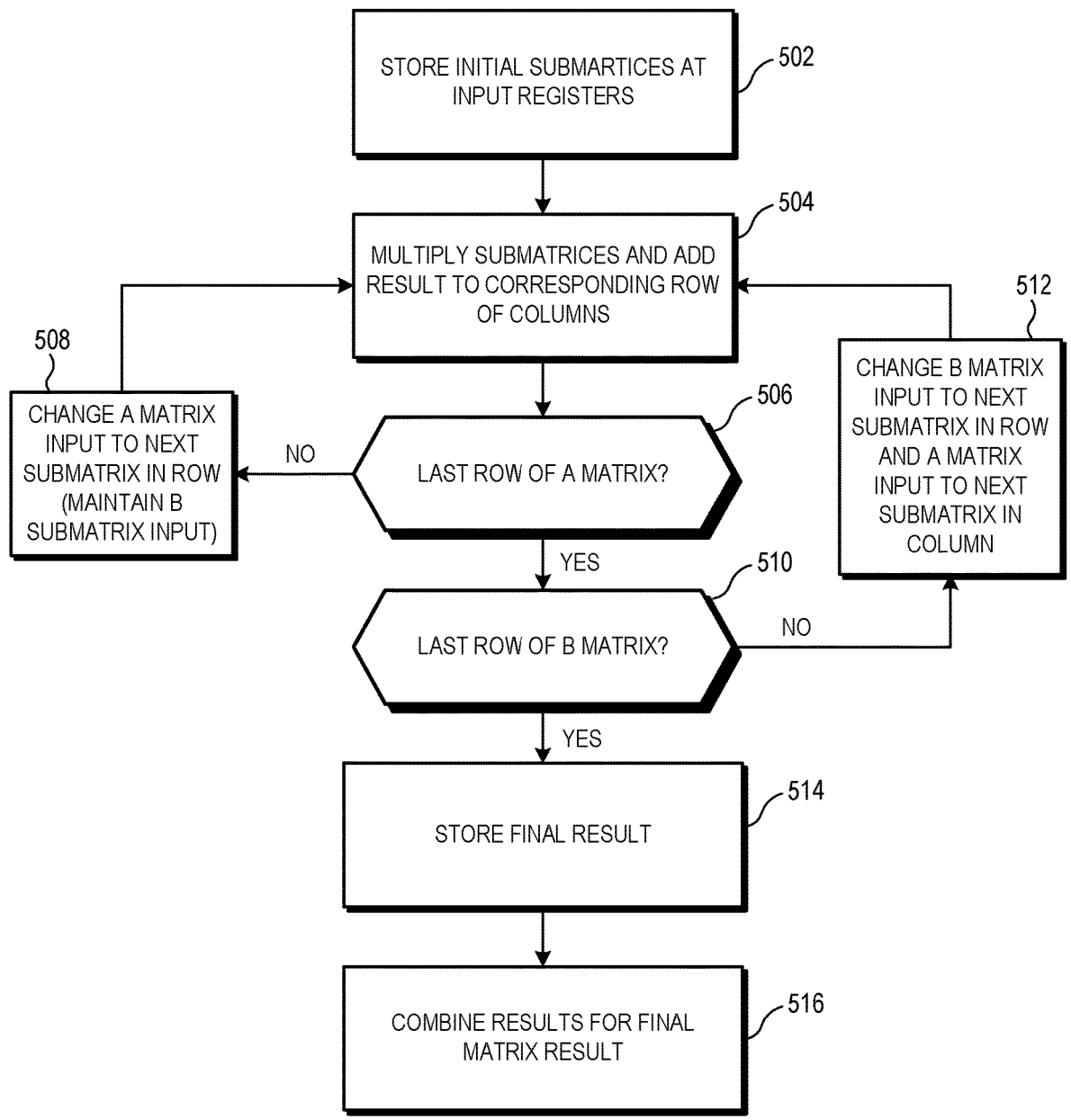
FIG. 5 is a flow diagram of a method of sequencing application of submatrices at a matrix multiplier of a GPU in accordance with some embodiments.

FIG. 5 is a flow diagram of a method 500 of sequencing application of submatrices at a matrix multiplier of a GPU in accordance with some embodiments. For purposes of description, the method 500 is described with respect to an example implementation at the GPU 100 of FIG. 1. At block 502, the sequencer 430 loads the initial submatrices (e.g. submatrices $A_{0,0}$ and $B_{0,0}$) from the data store 435 to the input registers 106 and 107, respectively. At block 504, the matrix multiplier 110 multiplies the submatrices stored at the input registers 106 and 107 to generate a product and adds the result to the intermediate result for the corresponding column of the result matrix R, if any, as set forth above. The method flow moves to block 506 and the sequencer 430 determines if the input submatrix at the input register 106 corresponds to the last row of the matrix A. If not, the method flow moves to block 508 and the sequencer 430 loads, to the input register 106, the submatrix of A corresponding to the current column (e.g., column 0) and the next row. The submatrix of B stored at the input register 107 is maintained, thereby conserving power. The method flow returns to block 504 and the matrix multiplier 110 executes the next multiply operation—that is, executes the next multiply cycle.

Returning to block 506, if the input submatrix at the input register 106 corresponds to the last row of the matrix A, the method flow moves to block 510 and the sequencer 430 determines if the input submatrix stored at the input register 510 corresponds to the last row of the matrix B. If not, the method flow moves to block 512 and the sequencer 430 loads to the input register 107 the submatrix of B corresponding to the column of R that is being calculated. In addition, the sequencer 430 loads to the input register 106 the submatrix of A corresponding to the initial row (e.g., row 0) and the next column. The method flow returns to block 504 and the matrix multiplier 110 executes the next multiply operation.

Returning to block 510, if the input submatrix stored at the input register 510 corresponds to the last row of the matrix B, the calculation of the corresponding column of result matrix R is complete. Accordingly, the method flow moves to block 514 and the SIMD 102 stores the final result for the column of R. At block 516 the GPU 100 combines each of the calculated columns to generate the result matrix R. In some embodiments, the GPU 102 provides the result matrix R to a CPU for further processing. In other embodiments, the GPU 100 employs the result matrix R to, for example, generate one or more objects in a display frame, and provides the display frame to a frame buffer for display at a display device.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
for a first multiply cycle of a matrix multiplier of a graphics processing unit (GPU) multiplying a first matrix and a second matrix:
multiplying a first submatrix of the first matrix stored at a first input register with a first submatrix of the second matrix stored at a second input register;
for a second multiply cycle of the matrix multiplier, the second multiply cycle succeeding the first multiply cycle:
multiplying the first submatrix of the first matrix stored at the first input register with a second submatrix of the second matrix stored at the second input register; and
maintaining the first submatrix at the first input register for the first multiply cycle and the second multiply cycle.

2. The method of claim 1, further comprising:
for a third multiply cycle of the matrix multiplier, the third multiply cycle succeeding the second multiply cycle:
multiplying the first submatrix of the first matrix stored at the first input register with a second submatrix of the second matrix stored at a second input register; and
maintaining the first submatrix at the first input register for the first multiply cycle the second multiply cycle, and the third multiply cycle.

3. The method of claim 1, wherein the first submatrix includes at least one non-zero element.

4. The method of claim 1, further comprising:
determining a product of the first matrix and the second matrix based on results of the first multiply cycle and the second multiply cycle, the product comprising a result matrix.

5. The method of claim 4, wherein determining the product comprises:
determining a submatrix of the result matrix based on results of the first multiply cycle and the second multiply cycle.

6. The method of claim 5, wherein the submatrix of the result matrix comprises one of a column and a row of the result matrix.

7. The method of claim 4, wherein determining the product comprises:
determining an outer product based on results of the first multiply cycle and the second multiply cycle.

8. The method of claim 1, further comprising:
for a third multiply cycle of the matrix multiplier, the third multiply cycle succeeding the first multiply cycle:
multiplying a second submatrix of the first matrix stored at the first input register with a second submatrix of the second matrix stored at the second input register; and
changing the first submatrix of the first matrix to the second submatrix of the first matrix for the third multiply cycle.

9. A method, comprising:
multiplying submatrices of a first matrix with submatrices of a second matrix at a matrix multiplier of a graphics processing unit (GPU) to determine a matrix product, wherein the multiplying comprises:
maintaining a first submatrix at a first input register of the matrix multiplier over a first plurality of multiply cycles.

10. The method of claim 9, wherein the multiplying further comprises:
changing submatrices at a second input register of the matrix multiplier over the first plurality of multiply cycles.

11. The method of claim 10, further wherein the multiplying further comprises:
maintaining a second submatrix at the second input register of the matrix multiplier over a second plurality of multiply cycles.

12. The method of claim 9, wherein at least one element of the first submatrix is a non-zero element.

13. A graphics processing unit (GPU), comprising:
a first input register;
a second input register;
a matrix multiplier to multiply a submatrix stored at the first input register with a submatrix stored at the second input register; and
a sequencer to control submatrices stored at the first input register and the second input register, the sequencer configured to:
for a first multiply cycle of the matrix multiplier store a first submatrix of a first matrix at the first input register and a first submatrix of a second matrix stored at the second input register; and for a second multiply cycle of the matrix multiplier, maintain the first submatrix of the first matrix at the first input register and store a second submatrix of the second matrix stored at the second input register, the second multiply cycle succeeding the first multiply cycle.

14. The GPU of claim 13, the sequencer is configured to:

for a third multiply cycle of the matrix multiplier, the third multiply cycle succeeding the first multiply cycle:

maintain the first matrix stored at the first input register and store a second submatrix of the second matrix stored at the second input register.

15. The GPU of claim 13, wherein the first submatrix includes at least one non-zero element.

16. The GPU of claim 13, wherein the sequencer is configured to:

determine a product of the first matrix and the second matrix based on results of the first multiply cycle and the second multiply cycle, the product comprising a result matrix.

17. The GPU of claim 16, wherein the sequencer is configured to determine the product by:

determining a submatrix of the result matrix based on results of the first multiply cycle and the second multiply cycle.

18. The GPU of claim 17, wherein the submatrix of the result matrix comprises one of a column and a row of the result matrix.

19. The GPU of claim 16, wherein the sequencer is configured to determine the product by:

determining an outer product based on results of the first multiply cycle and the second multiply cycle.

20. The GPU of claim 13, the sequencer is configured to:

for a third multiply cycle of the matrix multiplier, the third multiply cycle succeeding the first multiply cycle:

store a second submatrix of the first matrix at the first input register and a second submatrix of the second matrix at the second input register.

* * * * *